(12) United States Patent
Miles

(10) Patent No.: US 10,351,157 B2
(45) Date of Patent: Jul. 16, 2019

(54) COMPACT MULTIFUNCTION COLLAPSIBLE STROLLER AND CART

(71) Applicant: Stephen Miles, Falls Church, VA (US)

(72) Inventor: Stephen Miles, Falls Church, VA (US)

( * ) Notice: Subject to any disclaimer, the term of this patent is extended or adjusted under 35 U.S.C. 154(b) by 0 days.

(21) Appl. No.: 15/937,792

(22) Filed: Mar. 27, 2018

(65) Prior Publication Data

US 2018/0273075 A1   Sep. 27, 2018

Related U.S. Application Data

(60) Provisional application No. 62/476,950, filed on Mar. 27, 2017.

(51) Int. Cl.
*B62B 7/08* (2006.01)
*B62B 7/00* (2006.01)
*B62B 9/12* (2006.01)
*B62B 7/12* (2006.01)

(52) U.S. Cl.
CPC .............. *B62B 7/086* (2013.01); *B62B 7/002* (2013.01); *B62B 7/004* (2013.01); *B62B 7/12* (2013.01); *B62B 9/12* (2013.01); *B62B 2205/145* (2013.01); *B62B 2206/006* (2013.01)

(58) Field of Classification Search
CPC ......... B62B 7/086; B62B 7/002; B62B 7/004; B62B 7/12; B62B 9/12; B62B 2206/006; B62B 2205/145
See application file for complete search history.

(56) References Cited

U.S. PATENT DOCUMENTS

| 4,157,839 A | * | 6/1979 | Lahti | B62B 9/00 280/642 |
| 9,937,946 B1 | * | 4/2018 | Gillis | B62B 9/12 |

* cited by examiner

*Primary Examiner* — Erez Gurari

(57) ABSTRACT

A compact multifunction collapsible stroller and cart which provides increased convenience with its small factor when collapsed. It is able to be reversibly converted from a stroller to a shopping or utility cart. The seat and receptacle of the invention have no rigid connections to the wheeled frame, instead they are suspended in place by non-rigid connections such as cables or wires connecting them to the wheeled frame. The wheeled frame may be telescopic and collapsible, and can be wrapped in the flexible material of the seat or cart receptacle thereby allowing the seat or cart receptacle to act as a carrying bag.

9 Claims, 4 Drawing Sheets

COMPACT MULTIFUNCTION COLLAPSIBLE STROLLER AND CART

BACKGROUND OF THE INVENTION

The invention relates to strollers, shopping and utility carts, as well as any wheeled apparatus intended for transporting people, animals, or other loads. More specifically, the invention comprises a wheeled stroller that is convertible to a shopping cart and can be collapsed and folded down to a very compact and portable size.

Strollers are one of the most common and popular ways of transporting small children. There have been many improvements and refinements in their design over the years, but there is still one significant problem that has not been adequately addressed. Even the most lightweight and so called "compact" stroller does not collapse or fold down to a size that makes it easily portable (e.g. small enough to fit in a handbag or pocket). The typical stroller available in the market today is very useful when transporting a child but when the child is removed from the stroller (e.g. at an airport, or to walk down stairs) the stroller then becomes a very cumbersome piece of equipment.

The same problem exists when it comes to folding and collapsible shopping carts (sometimes referred to as utility carts). They are very helpful when in use but become cumbersome and unwieldy once they are emptied or not in use. It would be ideal to have a device with the same utility as these carts and strollers but that can neatly fit into a bag or pocket when not in use. When the user does not have to be concerned about dragging an empty shopping a cart around busy streets or maneuvering a large stroller on a bus or a train the user will likely use the cart or stroller more frequently. In fact, they may elect to keep the cart or stroller with them as a matter of routine. This means greater convenience for the user as they will have the utility of the cart or stroller available to them not just for planned use but also when there is an unanticipated need for a cart or stroller.

In the case of a stroller another drawback of the products available to consumers is their short period of usefulness. Strollers can be very expensive and each child will likely only make use of a stroller for a few short years. After this time, the stroller no longer serves any purpose. It would be preferable to have a stroller that could easily and interchangeably be converted into a shopping or utility cart.

SUMMARY OF THE INVENTION

The object of the invention is to provide the public with a stroller that can easily and reversibly be converted to a cart, and that can be efficiently collapsed to a portable size and shape. That is the user may transform the stroller into a cart or the cart into a stroller. More specifically it is the object of the invention to provide a stroller and cart with the following features:

- The connection between the wheeled frame and the seat (in the case of the stroller) or storage receptacle (in the case of the cart) consists only of flexible cables, cords, ropes, wires or similar materials. This is an important distinguishing feature of the invention, as there is no rigid frame directly attached to the seat or storage receptacle.
- The frame of the invention may consist of telescopic components that are connected to each other by one or more hinges and these hinged structures may rotate about said hinge(s) so that they rest parallel (or close to parallel) with one another when collapsed to make the invention compact and portable.
- When fully collapsed and closed the invention may be enclosed within the stroller seat or shopping cart receptacle, either of which may then act as a carrying bag for the invention.

DETAILED DESCRIPTION OF INVENTION

The drawings and description are intended to merely be illustrative of the novel and useful features of the invention to a person skilled in the art, and are not intended to limit the scope of the invention to only the exact embodiment described in this disclosure. The scale and arrangement of the components may be altered by a person skilled in the art while still retaining their intended function. Certain structures and details may be omitted when they are not of significant relevance to the features being described in order to provide greater clarity and simplicity.

Figure 1:
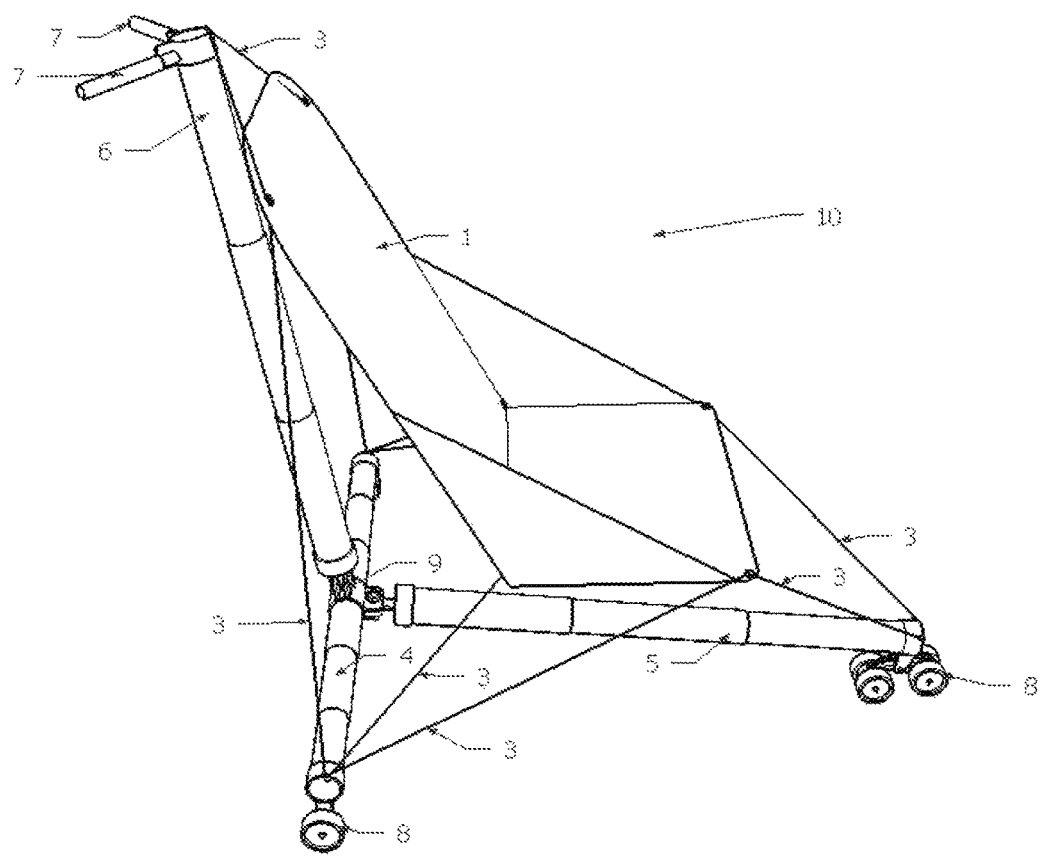
FIG. 1 Shows a perspective view of the invention configured as a stroller.

FIG. 1 shows the invention 10 configured as a stroller. The seat 1 of the stroller is suspended in place by connector cables 3 originating from points on the telescopic rear wheel support 4, telescopic front wheel support 5, and the telescopic vertical support 6. The telescopic components of the invention may be extended and collapsed incrementally. There is no direct connection between rigid components of the stroller frame and the seat 1. The connector cables 3 may be comprised of any non-rigid material that can supply the requisite tensile strength in order to suspend the seat (and the load it is designed to carry) in the desired position. The precise site of attachment for the connector cables 3 may vary. The connector cables 3 may retract into or next to the telescopic supports 4, 5, and 6. The connector cables 3 may attach to the seat and the telescopic supports 4, 5, and 6 in a manner that allows for their quick and easy disconnection and reconnection. Possible methods of achieving such a connection include (but are not limited to) carabiner clips, swivel hooks, and snap hooks, which may connect with structures (such as but not limited to) grommets embedded or otherwise attached to the seat 1. The tension and length of the connector cables 3 may be adjustable. Springs or other structures may be attached to connector cables 3 to reduce the transmission of vibrations to the seat and to improve seat comfort. It should be noted that the features discussed herein apply to both configurations of the invention (stroller and cart).

The seat 1 will preferably be comprised of soft or flexible material. The seat 1 will preferably have a restraint in the form of an adjustable seat belt or harness of a type similar to those commonly found incorporated into the fabric of the seats in so called umbrella strollers (in fact these restraints are virtually universal across most stroller types). The exact mechanism of the restraint may vary but most often involves a 3 point or 5 point harness that a person skilled in the art would be familiar with.

Figure 2:
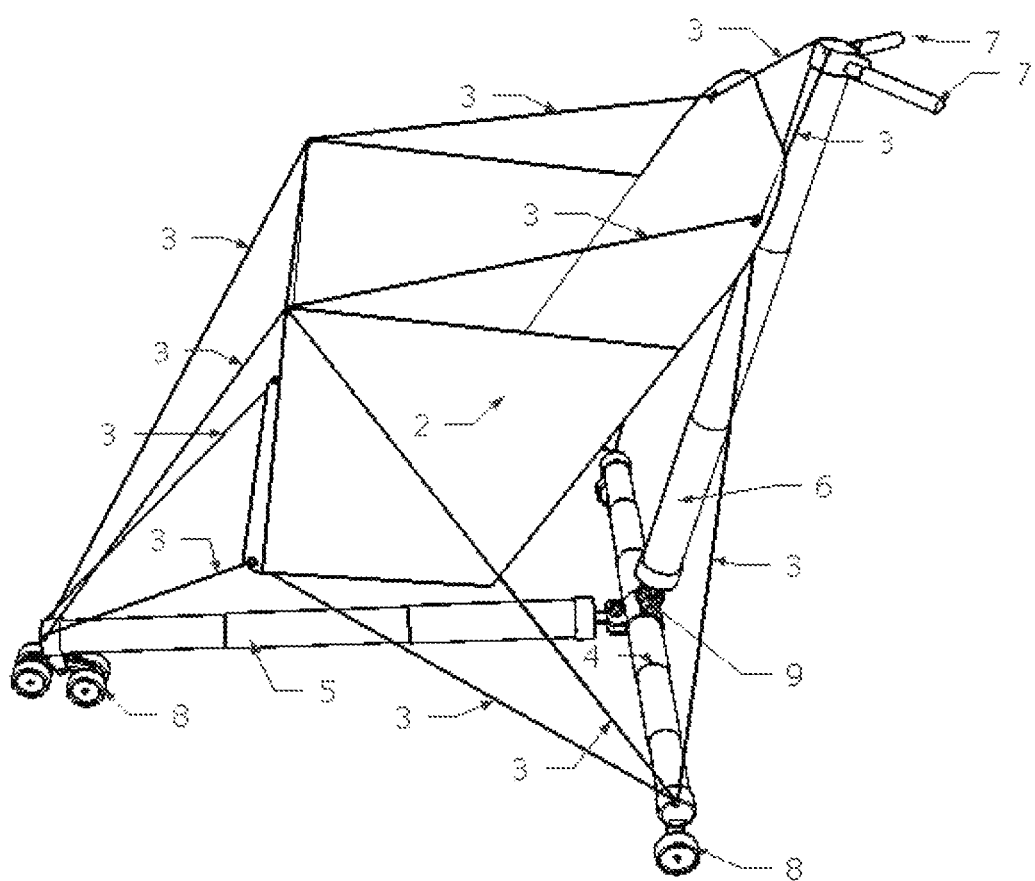
FIG. 2 Shows a perspective view of the invention configured as a shopping or utility cart.

FIG. 2 shows the invention configured as a shopping or utility cart. The shopping or utility cart receptacle 2 may be comprised of soft or flexible material and is suspended in place by connector cables 3 in the same manner as that described for the stroller seat 1. The receptacle 2 may include rigid or semi-rigid panels alone or in combination with other structural elements to optimize its shape, strength, and utility (as is also true of the stroller seat). The user may remove either the seat 1 or receptacle 2 and reattach whichever one suits their needs.

In addition to the option of converting the invention from a stroller to a cart (or from a cart to a stroller) by means of switching the seat 1 for the receptacle 2, the conversion may be accomplished without having to remove the seat 1. More specifically, the seat 1 may be transformed (reversibly) into a receptacle through the use of an insert that may attach to the seat or by repositioning portions of the seat 1 (e.g. flaps of fabric that may be stowed when not needed) and attaching them to each other or to the connector cables 3 to form the receptacle for a cart.

The stroller is intended to have the option of multiple seats (side by side or in tandem). As with the single seat 1 all seats of the invention may be adjustable (e.g. recline or be otherwise repositioned). Greater seating capacity may be achieved through modifying (if necessary) the telescopic expansion of supports 4, 5, and 6 or by adjusting the scale and position of these structural components. The conversion of the stroller with multiple seats to a cart would continue to be a possible option. The number, size and shape of the cart receptacles may vary. Both the stroller seat(s) and cart receptacle(s) have the option of having covers incorporated into their design or attached when desired by the user. The receptacle(s) of the shopping cart may be insulated (in part or in whole).

In all its configurations the invention is designed so that the only connection between the supports 4, 5, and 6 and the seat(s) or receptacle(s) are in the form of connector cables 3 or similar structures. In other words there is no rigid frame connecting the seat(s) or receptacle(s) to the supports structures 4, 5, 6 or other comparable structures.

Figure 3:
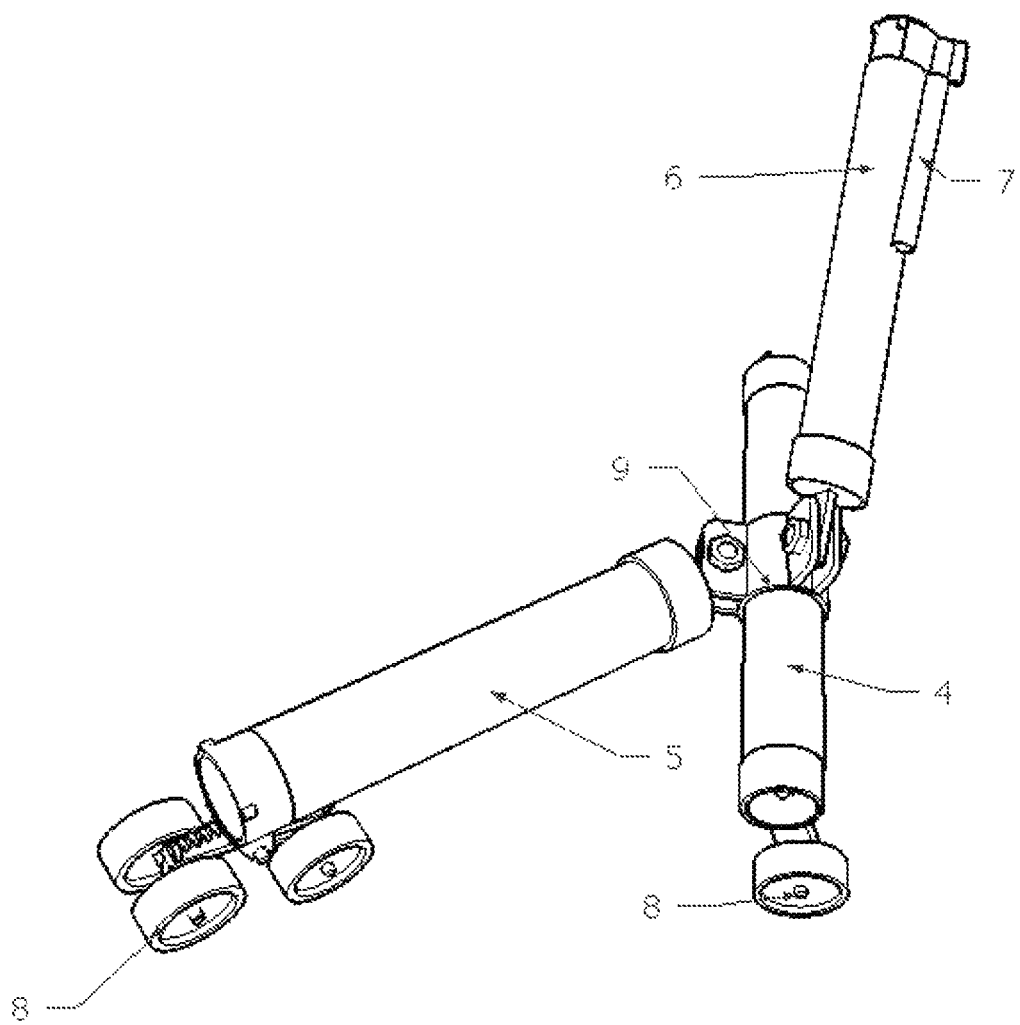
FIG. 3 Shows a perspective view of the invention illustrating its ability to fold and collapse to a portable size and shape. The stroller seat, cart receptacle, and connector cables are not shown.

FIG. 3 shows a perspective view of the invention with the telescopic support structures 4, 5, and 6 retracted and rotated at the double hinge 9 so that they are approaching their fully collapsed position where they are parallel, or nearly parallel to one another. This reduces the invention to a size that makes it highly portable. The angle at which structural supports 4, 5, and 6 are connected to the double hinge 9 may vary.

Furthermore, while structural support 4 may be a single structure around which the double hinge 9 is mounted, it may also consist of two separate components (one connecting to the right rear wheel and the right side of double hinge 9 and another component connecting to the left rear wheel and the left side of double hinge 9). In such an arrangement it may be desirable that what is depicted as a double hinge 9 may in fact be designed to act as a point of articulation (which may be incrementally controlled by the user) for the aforementioned left and right separate components of structural support 4 or for structural supports 5 and 6 as well. This would allow the user to control the exact position and angle of the structural supports 4, 5, and 6 in relation to one another about this central or shared point of articulation (which would be in a position similar to where the double hinge 9 is shown). The support structures 4, 5, and 6 are not required to be perfectly straight (these components may be curved) or at any one particular angle to one another. It should be noted that in FIG. 3 the seat 1, receptacle 2, and connector cables 3 are not shown to provide clearer visualization of support structures 4, 5, and 6.

While the invention is shown to have wheels 8 in a tricycle style configuration, it may in fact have additional structural elements, which may also be telescopic and fold or articulate about their respective hinged attachment(s). This may allow for 4 (or more) points of wheeled contact with the floor (e.g. a quadricycle style configuration). The connection between the support structures (wheeled frame) and the seat or cart receptacle would continue to be in the form of connector cables 3 (or similar structures). There would still be no direct rigid attachment of the structural supports (wheeled frame) to the seat or cart receptacle.

It should also be noted that while support structures 4, 5, and 6 are depicted as having a rounded tubular shape, this is not the only possible shape. It would be equally valid for said structures to have a variety of other shapes, including but not limited to, the square profile found on some aluminum extrusions (commonly referred to as square aluminum "tubing"). In addition, the double hinge 9 need not be one continuous structure. The same function may in fact be achieved by having two (or more) distinct hinges or points of articulation that allow for support structures 4, 5, and 6 to be positioned relative to each other in a manner that optimizes the functionality of the invention (e.g. providing a means for the invention to be wheeled, allowing for the suspension of a seat or receptacle, and allowing for easy and compact collapsing and folding). While the support structures 4, 5, and 6 are in their preferred embodiment telescopic, to make the invention compact when collapsed and folded, they may also be designed without the capacity to telescope or change length.

Figure 4:
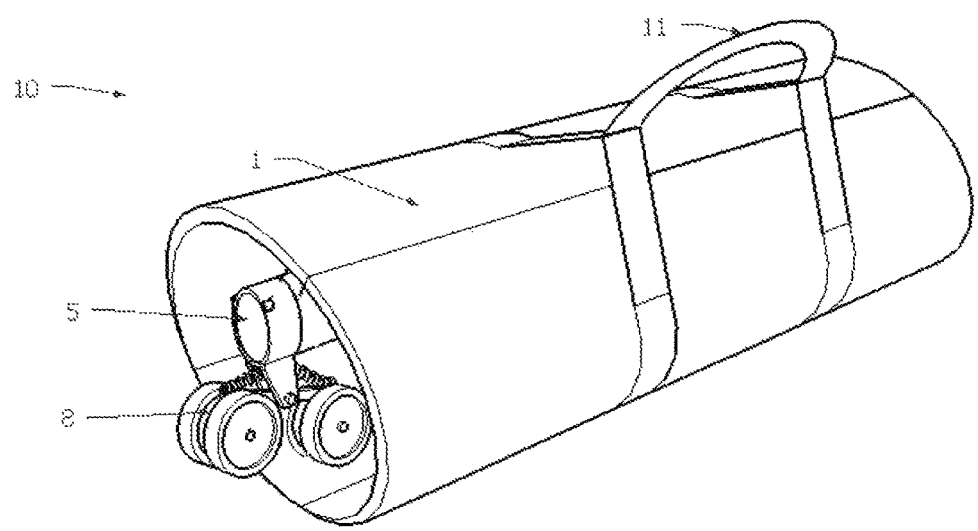
FIG. 4 Shows a perspective view of the invention fully collapsed and folded with telescopic components retracted and stored within the flexible seat of the stroller, creating a carrying bag.

Once the invention is collapsed in a manner similar to that shown in FIG. 4 the support structures 4, 5 and 6 and the seat 1 or cart receptacle 2 may be secured in a manner that holds the structures fixed in the closed or collapsed position. In this closed and collapsed configuration the seat 1 or cart, receptacle 2, if made of flexible material, may be used to wrap around the other components of the invention (i.e. the wheeled frame) to create a carrying bag as shown in FIG. 4. The seat 1 and cart receptacle 2 may have handles 11 (not to the exclusion of other straps or structures that make for easy transport) that allow for easy carrying of the invention. The seat 1 and cart receptacle 2 may have velcro straps, or other attachment mechanisms (e.g. clips or a zipper) to hold the sides of the seat 1 and cart receptacle 2 in place when they are being used as a carrying bag.

The extension and opening of the invention into a shopping cart or stroller configuration as well as the closing and collapsing of the invention may be assisted or accomplished by means such as (but not limited to) the following:

Spring tension system (as often used in umbrellas)
Pneumatic system

In addition to the handles 11, the seat 1 or receptacle 2 of the invention may have clips (or similar structures) attached in such a position so as to allow for the attachment of the invention when collapsed and enclosed within the material of the seat 1 or receptacle 2 to other structures such as (but not limited to):

Luggage
Belts
Belt loops
Handbags/purses
Coat hooks

Backpacks

The handles 7 may be rotated to rest flush against or in close proximity to vertical support structure 6. The invention may include wheel brakes, including but not limited to, a parking brake restricting movement of one or more wheels, and a braking system that allows the user to incrementally apply braking pressure to one or more wheels.

It should be noted that the stroller configuration of this invention is not limited to infants and children. The scale and weight capacity of the invention may be increased to accommodate larger people including adults of varying sizes and weights. The invention may also be used to transport pets and any other load that can safely be supported and transported by the invention.

The invention claimed is:

1. A transportation device comprising: a frame incorporating a plurality of members and at least a single wheel, a plurality of connecting members attached to the frame members for connecting cables thereto, a plurality of cable devices, and a receptacle device which incorporates a plurality of apertures through which the cable devices are placed; wherein the receptacle device is suspended from the frame exclusively by means of the cables.

2. The transportation device from claim 1, wherein the wheeled frame incorporates one or more telescopic structures.

3. The transportation device from claim 1, wherein the members of the wheeled frame articulate in such a manner that when the device is not in use these structures are stowed in a position where they are substantially parallel to one another.

4. The transportation device from claim 1, wherein the receptacle device can be used as a carrying bag for carrying the wheeled frame therein.

5. The transportation device from claim 1, wherein a seat is suspended from the wheeled frame exclusively by means of a plurality of cable devices, said cable devices attach to the seat by being placed through a plurality of apertures incorporated into the seat and connect to the frame by attaching to a plurality of connecting members of the frame, in addition, the wheeled frame incorporates one or more telescopic structures.

6. The transportation device from claim 1, wherein a seat is suspended from the wheeled frame exclusively by means of a plurality of cable devices, said cable devices attach to the seat by being placed through a plurality of apertures incorporated into the seat and connect to the wheeled frame by attaching to a plurality of connecting members of the wheeled frame, in addition, the wheeled frame incorporates one or more telescopic structures, when the device is not in use, the members of the wheeled frame articulate in such a manner that they are stowed in a position where they are substantially parallel to one another.

7. The transportation device from claim 1, wherein a seat is suspended from the wheeled frame exclusively by means of a plurality of cable devices, said cable devices attach to the seat by being placed through a plurality of apertures incorporated into the seat and connect to the frame by attaching to a plurality of connecting members of the wheeled frame, in addition, the wheeled frame incorporates one or more telescopic structures, when the device is not in use, the members of the wheeled frame articulate in such a manner that they are stowed in a position where they are substantially parallel to one another, the seat can be used as a carrying bag for carrying the wheeled frame therein.

8. The transportation device from claim 1, wherein the members of the wheeled frame incorporate no more than two points of articulation to allow the members of said wheeled frame to articulate from their stowed position, substantially parallel to one another, to their fully deployed position, in readiness for the use of said transportation device, furthermore, each component of the wheeled frame is separately telescopic.

9. The transportation device from claim 1, wherein the members of the wheeled frame incorporate no more than two points of articulation to allow the members of said wheeled frame to articulate from their stowed position, substantially parallel to one another, to their fully deployed position, in readiness for the use of said transportation device, furthermore, a seat is suspended from the wheeled frame exclusively by means of a plurality of cable devices, said cable devices attach to the seat by being placed through a plurality of apertures incorporated into the seat and connect to the wheeled frame by attaching to a plurality of connecting members of the wheeled frame.

* * * * *